United States Patent [19]

Denecke

[11] Patent Number: 4,646,167
[45] Date of Patent: Feb. 24, 1987

[54] TIME CODE DECODER

[76] Inventor: Henry M. Denecke, 629 W. Knoll Dr., Los Angeles, Calif. 90069

[21] Appl. No.: 738,032

[22] Filed: May 24, 1985

[51] Int. Cl.$^4$ .................. G11B 27/02; G11B 15/18
[52] U.S. Cl. ................................ 360/14.3; 360/72.2
[58] Field of Search ............... 360/14.3, 72.2; 360/49

[56] References Cited

U.S. PATENT DOCUMENTS

| | | | |
|---|---|---|---|
| 4,175,267 | 11/1979 | Tachi | 360/72.2 |
| 4,300,171 | 11/1981 | Tachi | 360/72.2 |
| 4,360,843 | 11/1982 | Menezes et al. | 360/14.3 |

*Primary Examiner*—Vincent P. Canney
*Attorney, Agent, or Firm*—Drucker & Sommers

[57] ABSTRACT

A device for enabling detecting of the time code word prerecorded on each frame of videotape, for use in videotape production functions. The device is adapted to enable locking onto time code input signal frequencies rapidly and efficiently over a wide range of videotape running speeds. It is further adapted to enable detecting of errors in the time code input signal efficiently and effectively. The device includes an input signal frequency locking circuit, including at least one phase lock loop, responsive rapidly over a wide range of videotape running speeds for enabling decoding of difficult-to-read time code, and for generating the circuit clock frequency. The device further includes a valid sync word detecting circuit, including a counter, and a pulse counting circuit, including at least one counter, for detecting error in the time code signal and preventing loading of invalid time code.

17 Claims, 2 Drawing Figures

TIME CODE DECODER

BACKGROUND OF THE INVENTION

The invention relates generally to devices for enabling reading of videotape time code. It relates specifically to such a device adapted to enable detecting of the time code word prerecorded on each frame of videotape to identify each such frame, for use in videotape production operations including editing, logging, and syncronizing.

The prior art includes devices for reading time code prerecorded on each frame of videotape. However, such devices further shifted the time code signal into shift registers to detect the sync word in the time code and then decoded the time code signal, a relatively complex, expensive, and inefficient method therefor. Such devices further responded and locked on to the input frequency of the time code signal relatively slowly, over a relatively narrow range of videotape speed variations. Further, such devices were unable to read time code from videotape running at uneven speeds, requiring speed stabilization for reading thereof.

Such devices further included a relatively-large number of systems therein for detecting errors in the time code read, thereby making such devices expensive and complex. They further included expensive wideband amplifiers and restrictive phase shift and frequency input requirements in the input circuit. If the azimuth of the videotape recorder head was even slightly out of alignment with the tape, as frequently occurred, accurate reading of the videotape time code was made difficult if not impossible for such devices, and frequent re-alignment of the head was required. Still further, a display of time code as read by such devices, being held on a screen, was subject to being erased by ambient extraneous noise entering the system.

SUMMARY OF THE INVENTION

The invention is adapted to overcome the above problems, as well as others, associated with the prior art. It provides an efficient and effective device for enabling detecting of the time code word pre-recorded on each frame of videotape for identifying each such frame, locking onto input signal frequencies rapidly and efficiently over a wide range of videotape running speeds. It further provides such a device for enabling detecting of time code over a wide dynamic input range without strict input requirements, including a relatively small number of highly efficient elements for detecting error in the time code signal, and relatively inexpensive elements for accurately reading the time code word for enabling frame-accurate time code videotape production functions.

The device includes an output time code receiving circuit adapted to be operable over a wide dynamic range without strict input signal requirements, and an input signal frequency locking circuit adapted to be operable rapidly over a wide range of videotape running speeds for enabling decoding of difficult-to-read time code, and for generating the circuit clock frequency.

The device further includes a valid sync word detecting circuit adapted to detect any error in the time code signal and prevent the reading of invalid time code, a videotape direction detecting circuit for detecting the direction in which the videotape is running, and a pulse counting circuit adapted to count the pulses in the time code for detecting any error therein to enable loading of valid time code and prevent loading of invalid time code.

The device still further includes a frequency detecting circuit, adapted to detect an input signal below a preset frequency and prevent the generation of an output signal therefrom.

DETAILED DESCRIPTION OF THE INVENTION

Figure 1:
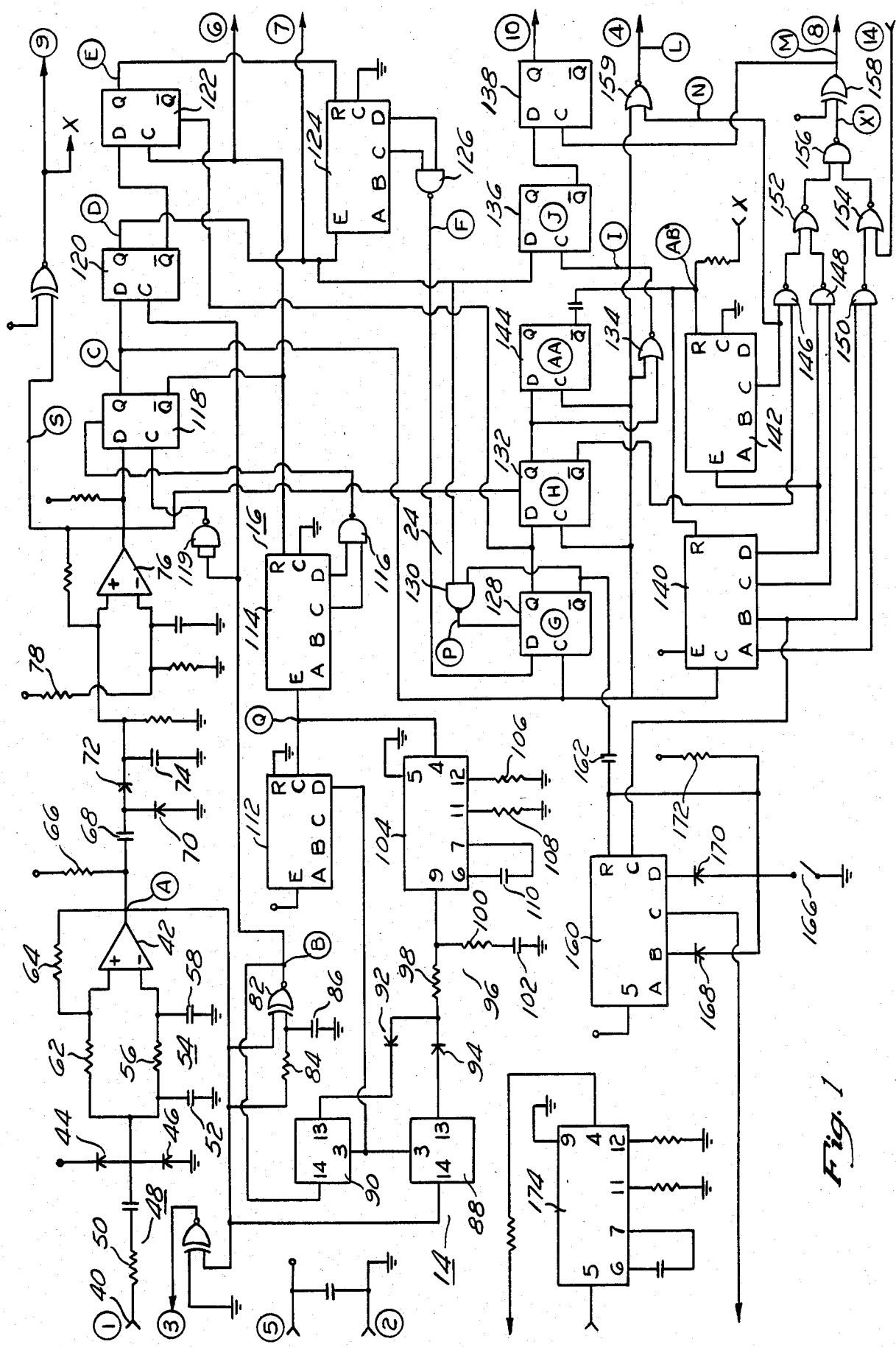
FIG. 1 is a schematic circuit diagram of the time code decoder circuit, pursuant to the invention.
Figure 2:
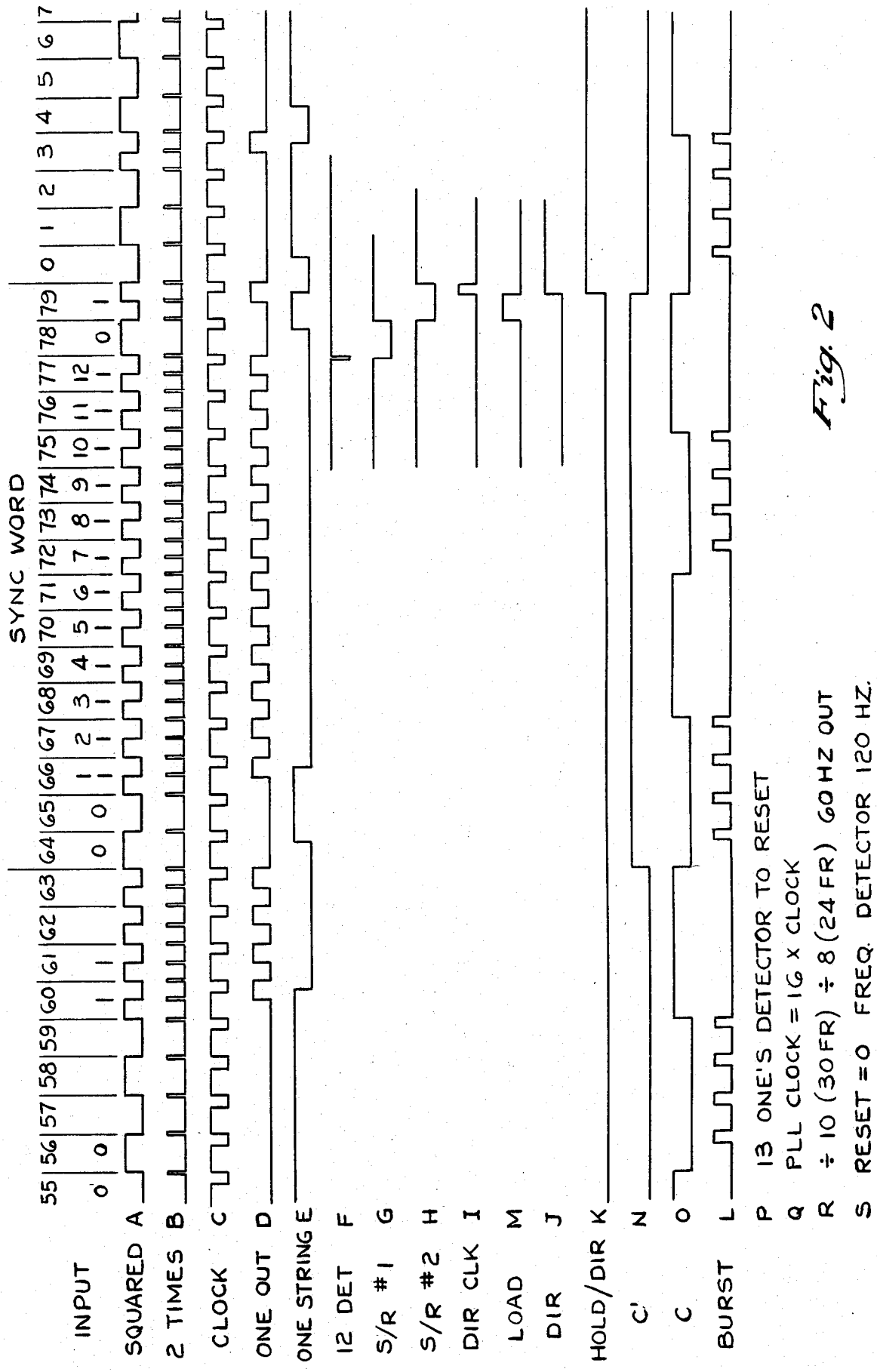
FIG. 2 is a timing diagram of the signals in the time code decoder, pursuant to the invention.

The invention, as shown in FIGS. 1-2, and as described herein, comprises a device for detecting the electronic binary arithmetic time code word prerecorded on each frame of videotape. Such recorded time code word uniquely identifies each videotape frame, as described in "Time Code Handbook" by Hickman and Merhan (1982), in Chapter 2 thereof, incorporated by reference herein.

The time code information is encoded in bi-phase modulation, with a binary "0" created when the signal shifts either high or low, up or down, and with a binary "1" created when there is a second voltage shift halfway through the bit period, allowing the code to be read forward or reverse, at fast or slow speeds.

Each time code word is divided into eighty bits, numbered "0"-"79", with each such bit created by such fluctuations or shifts in the voltage of the time code signal. The eighty bit time code word is divided into sets of alternating groups of four bits each, and a sixteen bit sync word. One set of alternating four bit groups represents time address bits, for identifying the videotape frame, while the other set of alternating four bit groups represent user bits, for recording data the user may require. The sixteen bit sync word enables detection of whether the videotape is running forward or reverse.

The time code decoder herein is adapted to enable videotape production functions, such as editing and logging, to be conducted in an efficient, frame accurate, and effective manner. It includes a plurality of functional circuits, interconnected and functionally operational as set forth below, as shown in the circuit diagram in FIG. 1, and with the signals, at various points in such circuit, shown in the timing diagram in FIG. 2.

The time code decoder, as shown in FIG. 1, includes an input stage 10, adapted to enable decoding of an input time code signal over a wide dynamic range, as for example from about −35 decibels to about +30 decibels, without a wideband amplifier, and without strict phase shift frequency input requirements. It further includes a frequency detector circuit 12, the output signal of which is connected to the rest of the circuit to reset counters and turn off a clock oscillator, if the input signal is below a preset frequency, thereby turning off the entire reader circuit thereupon. Frequency detector circuit 12 is further adapted to act relatively slowly, not accepting time code until it gets a signal of about 100 hertz, thereby enabling a display of decoded time code to be retained for a long time.

The time code decoder further includes a phase lock loop stage 14, adapted to lock onto almost any frequency within the range of the time code, for frame-accurate decoding, and to lock onto even very jittery or otherwise difficult to read time code. Phase lock loop stage 14 is further adapted to change very quickly to the right frequency, to lock in at very slow or very fast tape speeds, very quickly, and to generate the clock frequency. The time code decoder further includes a clocked one-shot circuit 16, adapted to take a "1" pulse, hold it for a certain length of time, and release it after the required number of clock pulses, to provide a clock with a 75 percent duty cycle, enabling reading of very hard to read time code with up to 12½ percent jitter.

The time code decoder further includes a one-detector circuit 18, adapted to detect a "1" in the circuit, such that every time there is a "1", there is an ouput pulse, and a string-of-ones detector circuit 20, adapted to detect a signal including a string of ones. It still further includes a sync word detector stage 22, adapted to detect a valid sync word in the time code, to detect any error in the time code, and to prevent reading of invalid time code. A shift register circuit 24 is adapted to initiate the process of counting the time code pulses up.

The time code decoder further includes a direction detecting stage 26, adapted to detect whether the videotape is running in the forward or reverse direction. It further includes a counter stage 28, adapted to count the number of pulses in the time code and detect whether the time code is valid or invalid, detecting errors in the time code, enabling loading of valid time code from shift registers into latches for further use thereof, and preventing loading of invalid time code.

The time code decoder still further includes a film synchronization stage 30, adapted to generate an output signal usable for film synchronization functions. It further includes a display clock stage 32, adapted to generate a display clock output signal for multiplexing the display.

Input stage 10 is adapted to generate a symmetrical signal at very low input signal levels, with hysterisis. It includes pin 40 at point "1", at which the input signal from the videotape is fed in. It further includes comparator 42, adapted to compare signals at the two inputs thereof and provide an output indicating agreement or disagreement thereof. A pair of diodes 44 and 46 set the limits of input circuit 10, as for example, between +5 volts and ground, limiting the swing of the input such that comparator 42 will switch "on" at any voltage between zero and +5 volts.

Input stage 10 further includes a low pass filter 48, which includes resistor 50 and capacitor 52, adapted to filter out noise, pass all frequencies below, but not above, the reference frequency with little or no signal loss, and discriminate strongly against the higher frequencies.

Input stage 10 still further includes a DC filter 54, including resistor 56 and capacitor 58, which sets the operating point of the negative input to comparator 42. With a low voltage square wave input, DC filter 54 sets the DC voltage at exactly the halfway point at the negative input to comparator 42. It further includes a voltage divider 60, which includes resistor 62 and resistor 64, adopted to form a voltage divider and set up a small amount of hysteresis so that the signal will not oscillate. An exemplary square wave signal at point "A" of input stage 10 is shown in FIG. 2. Comparator 42 further includes pullup resistor 66 connected to the positive supply voltage thereof.

Frequency detector circuit 12, connected the the output of input stage 10, is adapted to start to detect frequencies above a pre-set frequency, as for example above 100-200 hertz. It includes coupling capacitor 68, which feeds diodes 70 and 72 to generate a DC voltage when there is an input. It further includes capacitor 74, charged up by the output DC voltage, and comparator 76, adapted to be turned on as soon as the voltage in capacitor 74 goes above a certain voltage. Two resistors 78 and 80, connected to the negative input of comparator 76, set the voltage at which comparator 76 "on," and at which the output signal at point "S" goes to "1." The output "S" of frequency detector stage 12 goes to the rest of the circuit to reset counters and turn off a clock oscillator, such that if anything is below the preset frequency, it turns the system off.

Phase lock loop stage 14 is connected to the output of input circuit 10, and includes an edge detector, exclusive OR gate 82, into one input of which square wave time code signal "A" is fed. It further includes resistor 84 and capacitor 86, through which square wave time code signal "A" is further fed, which creates a delay, such that the two signals at edge detector 82 are not the same, whereby the output signal goes to "1". This provides a narrow pulse in the output signal at point "B," in each transition of signal "A" from negative to positive and from positive to negative, thereby providing a frequency doubler.

Phase lock loop stage 14 further includes phase lock loops 88 and 90, each adapted to lock onto and track a reference signal. The square wave signal "A," at the fundamental frequency, is fed into phase lock loop 88, and the narrow pulse frequency-doubled signal "B," at two times the fundamental frequency, is fed into phase lock loop 90. Exemplary of such phase lock loops are the CMOS phase-locked loops CD4046B types described at pages 2-119 through 2-125 of the 1978 National Semiconductor CMOS Databook, incorporated by reference herein. The outputs for phase lock loops 88 and 90 are connected through diodes 92 and 94, with phase lock loop 90 setting the upper frequency limit and phase lock loop 88 setting the lower frequency limit. The output from loops 88 and 90 is summed together, and fed into compensation circuit 96 therefor, which includes resistors 98 and 100, and capacitor 102.

Phase lock loop stage 14 still further includes voltage-controlled oscillator 104, to the input of which is connected compensation circuit 96. The operating range of voltage controlled oscillator 104 is set with resistors 106 and 108, and the frequency is set by capacitor 110. For example, the operating range of voltage controlled oscillator 104 may be set at one-twentieth sound speed (sound speed being twenty-four frames per second) to twenty times sound speed, and the operating frequency, signal at point "Q", for example, may be sixteen times higher than the desired final clock frequency of twenty-four hundred hertz.

Phase lock loop stage 14 still further includes a divider 112, which may, for example, comprise a divide-by-sixteen divider, and the "D" output therefrom is connected to the inputs of both phase lock loops 88 and 90, such that both such loops will see an upper and lower frequency. Phase lock loop stage 14 will then respond only to frequencies outside the bandwidth, which is one octave, 1 K to 2 K. Since time code in Manchester code is at either a fundamental first octave frequency or double the frequency, the phase lock loop circuit enables decoding thereof in a very precise manner.

Clocked one-shot circuit 16 includes divider 114, to the enable input of which is connected the output signal "Q" of divider 112, at sixteen-times the clock frequency. Exemplary of such dividers are the CMOS dual synchronous up counter CD4520B type described at pages 2-233 through 2-241 of the 1978 National Semiconductor CMOS Databook, incorporated by reference herein. Divider 114 may, for example, be a divide-by-twelve divider, the "C" and "D" outputs of which are connected to NAND gate 116. The output of NAND gate 116 is fed to the reset of dual "D" flip flop 118. Dual "D" flip flop 118 is clocked at input "C" thereof by signal "B", at the doubled frequency, through NAND gate 119.

When frequency detector circuit 12 goes to a "1", it turns "on" the device, and the "D" input in dual "D" flip flop 118 goes high. When a clock pulse, inverted signal "B", triggering on the negative edge of "B" for timing purposes, is fed in at input "C" of dual "D" flip flop 118, the "Q" output goes high. When there is a reset signal from the outputs of counter 114 at dual "D" flip flop 118, it brings the "Q" output back down to "0". Thus, the "Q" output of dual "D" flip flop 118 is a clock signal at point "C" of the circuit, the signal being shown in FIG. 2, with a seventy-five percent duty cycle.

The inverted "B" signal, at clock input "C" of dual "D" flip flop 118, turns it "on" for seventy-five percent of the time, and as soon as counter 114 reaches "12", it resets dual "D" flip flop 118 which turns off until another inverted "B" clock pulse is fed in, whereupon the cycle is repeated.

When the inverted "B" signal fed into dual "D" flip flop 118 is a "1", it turns the device on. The device stays on for 50% of the time, when it is clocked again. However, since the device is already clocked, it ignores that pulse, and resets at the 75% point which is at a count of "12" on counter 114, until it gets another clock pulse, at which point it turns on again, thereby generating the clock signal related to the pulses.

One-detector circuit 18 includes RS flip flop 120, to the "D" input of which is connected the "Q" output of dual "D" flip flop 118, and to the "C" input of which is connected the "B" signal. When "Q" is high, it allows the narrow "B" pulse to go through and reset RS flip flop 120. The "Q" output of RS flip flop 120 comprises wave form "D" in FIG. 2, a series of ones, which further comprises a "Data" output signal at point "7". Thus, every time there is a "1", there is an output.

String-of-ones detector circuit 20 includes flip flop 122, to the "D" input of which the inverted "Q" output of RS flip flop 120 is fed. The inverted "Q" output of dual "D" flip flop 118 is fed into input clock "C" of flip flop 122, and into reset "R" input of divider 114, and is a "Clock" output signal at point "6". Flip flop 122 turns "on" upon receiving a string of ones on the negative transition of the clock, and stays low until it stops receiving a string of ones, whereupon it goes back up on the next negative transition of the clock after such string of ones, as output signal "E".

Sync word detector stage 22 includes counter 124, to the "R" reset input of which is applied signal "E" from the "Q" output of flip flop 122. Counter 124 is a divide-by-twelve counter, adapted to detect the standard sync word in the time code. Signal "E" holds reset "R" low in counter 124 such that counter 124 can count up to twelve. When counter 124 reaches twelve, the outputs "C" and "D" therefrom are nanded together in NAND gate 126, generating signal "F", which is fed into the "D" input of flip flop 128.

Shift register circuit 24 includes flip flop 128, into the "D" input of which is fed output signal "F" from NAND gate 126, with clock signal "C" fed into the "C" input thereof.

The clock signal "C", at input "C" of flip flop 128, causes the "D" input to transfer to the "Q" output of flip flop 128, which is fed back to the reset of flip flop 122. When flip flop 122 is reset, it brings the reset input "R" of counter 124 high, turning counter 124 back off to zero.

If the "D" signal at enable input "E" of counter 124 is not twelve pulses long, there never is an output signal "F", whereby the system does not start working, but instead just ignores the signal. As soon as counter 124 gets twelve pulses, it recognizes a valid sync word, and transfers the output "Q" to NAND gate 126, initiating the process of counting everything up.

If there are thirteen ones, the inverted "Q" output signal of flip flop 128 and the "D" signal from the "Q" output of RS flip flop 120 are nanded together in NAND gate 130, with resulting output signal "P" therefrom resetting flip flop 128, such that thirteen ones is invalid, indicating a bad word or bad information, resetting the entire system so that nothing goes through.

If there is a valid twelve pulse sync word signal, flip flop 128, operating as a shift register, has an output signal "G", on bit "78", after the sync word bits, shifting signal "F" to "G" on bit "78", as shown in FIG. 2. If the signal at "G" is not a zero, the device counts thirteen and turns the whole reader off, constituting invalid information. On the next clock pulse, in flip flop 132, signal "G" shifts to signal "H", as shown in FIG. 2, with flip flop 132 likewise operating as a shift register.

Direction detecting stage 26 includes NAND gate 134, into which output "H" from flip flop 132 is fed, along with clock signal "C". When NAND gate 134 is "on", with "Q" low in flip flop 132, this permits one clock pulse to go through at the precise time to indicate whether bit "79" on the timing diagram in FIG. 2 is a "1" or "0", as output signal "I", fed into the "C" input of flip flop 136.

If the videotape and time code are running in the forward direction, the sync word is read in the forward direction, and the reader detects twelve ones, a zero and a one. If the videotape and time code are running in the reverse direction, the signal comprises twelve ones, a zero and a zero. The data signal "D" is fed into the "D" input of flip flop 132. If that pulse is a one, it is clocked at the precise time to transfer "D" to inverted "Q" in flip flop 136, with the "J" output signal fed into the input "D" of flip flop 138, to generate an output "Forward/Reverse" signal at point "10", indicating the forward or reverse direction of running of the videotape, where it is held until it is clocked at input "C" of flip flop 138.

Counter stage 28 includes counters 140 and 142, set up as ripple counters. Clock signal "C" is fed into the "C" input of counter 140. Counters 140 and 142 start counting upon being reset by reset signal "AB" from flip flop 144. Signal "AB" is generated from the inverted "Q" output of flip flop 144, providing a small positive pulse. Flip flop 144 delays pulse "H", at input "D" thereof, one more clock pulse, generating the "AA" output signal, at the inverted "Q" output, which is the same as "H" but delayed one pulse for purposes of the proper timing of such pulses.

Counters 140 and 142 start counting after being reset, with the first pulse in the count being clocked at bit "0". Such counters count up to bit "79", and when they reach bit "79", sum everything into a string of NAND gates 146, 148, 150, 152, 154, and 156, with inputs thereto from outputs "A", "B", "C", "D" of counter 140, output "C" of counter 142, inverted "Q" output of flip flop 132, which is the inverted "H" output signal, and an inhibit signal input at point "14" and fed into NAND gate 154, and, through exclusive OR gate 158, generate load output "Load" signal "M" at point "8", also fed into flip flop 138 as the clock signal at input "C". Clock signal "C" and output signal "N" at output "C" of counter 142 are nanded together at NAND gate 159 to generate "Shift Register Clock" output signal "L" at point "4".

If, at point X' in the circuit diagram in FIG. 1, the inverted "H" signal and the "M" signal coincide, there is a valid sync word and a valid piece of time code. Thus, the inverted "Q" output, comprising inverted "H", outputs every time there is a valid sync word, and "M" outputs every time there is a valid sync word and a valid number of pulses per frame. With seventy-nine clock pulses added up at point X', there is a valid sync word.

If there is a dropout in the videotape, or there is something wrong with the time code, counter stage 28 is not going to count, and the sync word is not going to be lined up, and as a result, the system will be unable to load the shift registers into latches.

With the videotape running in the forward direction, the videotape frame time code address is detected by clocking the first four bits (time address code) numbered 0–3, with the "C" output of counter 142, allowing four pulses to go out at "L". Then, counter 142 goes high while the next group of four bits, user code, go through, and then it goes low again for four more pulses, further time address code, thereby only shifting into the shift register the proper time code address information.

With the videotape running in the reverse direction, after the sync word in reverse, the first group of four bits are user bits, numbered 63, 62, 61, and 60, then time address bits, etc.

Film synchronization stage 30 includes counter 160, clocked at input "C" thereof by an output "B" of counter 140, and resettable at input "R" thereof by inverted "Q" output of flip flop 126 through capacitor 162. Such circuit further includes feedback circuit 164, which is switchable at switch 166. Feedback circuit 164 further includes diodes 168 and 170, and pullup resistor 172.

Upon closing switch 166, feedback circuit 164 is disconnected from counter 160. Counter 160 then is operable to take clock pulse "C", comprising output "B" of counter 120, and divide same by eight, resulting in an output signal "C" adapted for use in film synchronization at twenty-four frames per second and sixty hertz.

Upon opening switch 166, feedback circuit 164 is connected to counter 160 at reset input "R". Feedback is provided through diodes 168 and 170, and pullup resistor 172, synchronized with the inverted "Q" signal from flip flop 126 through capacitor 162. Counter 160 is then operable to take clock pulse "C", comprising output "B" of counter 120, and divide same by ten, resulting in an output signal "C" adapted for use in film synchronization at thirty frames per second and sixty hertz.

Display clock stage 32 includes voltage controlled oscillator 174, adapted for use in generating an approximately 1000 hertz display clock output at "4" for multiflexing the display. An inhibit input is applied at "5" to inhibit the color flag pulse and drop frame pulse in the time code, which, if not inhibited, would result in erroneous readings of the digits in the time code.

The outputs of the time code decoder are adapted to load shift registers and perform all the manipulations required therefor, with the output therefrom adapted to be fed into a tristate decoder latch to drive a binary coded decimal line into a decoder and to drive a display, with a counter driving the latch and scanning the display such that each number in the time code display is accurately sequential.

The above features of the device enable decoding of an input time code signal over a wide dynamic range, as for example from about −35 decibels to about +30 decibels, without a wideband amplifier, and without strict phase shift frequency input requirements. They further enable resetting of counters and turning off a clock oscillator, if the input signal is below a preset frequency, thereby turning off the device thereupon. Such features further enable the device to act relatively slowly, not accepting time code until it gets a minimum signal, thereby enabling a display of decoded time code to be retained for a long time.

Such features of the device further enable locking onto almost any frequency within the range of the time code, for frame-accurate decoding, and locking onto even very jittery or otherwise difficult to read time code, changing very quickly to the right frequency, to lock in at very slow or very fast tape speeds, very quickly, and to generate the clock frequency. They further enable reading of very hard to read time code over a wide range of jitter.

Such features still further enable detection of a valid sync word in the time code, to detect any error in the time code, and to prevent reading of invalid time code. They further enable detecting of whether the videotape is running in the forward or reverse direction, and counting of the number of pulses in the time code to detect whether the time code is valid or invalid, detecting errors in the time code decoded, enabling loading of valid time code from shift registers into latches for further use thereof, and preventing loading of invalid time code.

Preferred embodiments of the invention have been set forth above, for the purpose of explaining the invention. However, it is to be understood that variations may be made in such embodiments, which variations are nevertheless within the scope and spirit of the invention, as set forth in the claims herein.

I claim:

1. A device for enabling detection of an electronic binary arithmetic time code word pre-recorded on each frame of a videotape, adapted to enable decoding of an input time code signal from the videotape over a wide dynamic range without a wideband amplifier or strict phase shift frequency input requirements, to lock onto and track input frequencies within the range of the input time code signal rapidly, over a wide range, from a small fraction to a large multiple, of normal videotape running speed and over a wide range of signal distortion, for enabling frame-accurate and difficult-to-read time code decoding, and for generating a unitary clock frequency to detect a valid sync word in the time code, to detect any error in the sync word decoded and prevent the reading of invalid time code, to detect the direction of running of the videotape, and to count the number of pulses in the time code decoded, to enable loading of valid time code and prevent loading of invalid time code, comprising:

(a) means for receiving an input time code signal from the videotape, adapted to be operable over a wide dynamic range without a wideband amplifier or strict phase shift frequency input requirements;

(b) means for locking onto and tracking signals within the range of the input time code signal, adapted to be operable rapidly, over a wide range, from a small fraction to a large multiple, of normal videotape running speeds and over a wide range of signal distortion, for enabling frame-accurate and difficult-to-read time code decoding, and further adapted to generate a unitary clock frequency, connected to the input signal receiving means;

(c) means for detecting a valid sync word in the time code signal, adapted to detect any error in the time code signal, and to prevent the reading of invalid time code, connected to the input signal receiving means and the signal locking and tracking means;

(d) means for detecting the direction in which the videotape is running, connected to the valid sync word detecting means; and (e) means for counting the number of pulses in the time code, for detecting any error in the time code, and for enabling loading of valid time code and preventing loading of invalid time code, connected to the input signal receiving means; and (f) means for initiating the process of counting the time code pulses up, connected to the sync word detecting means and the counting means.

2. A device as in claim 1, in which the signal locking and tracking means comprise a pair of phase-locked loops, the output of each of which is adapted to lock onto and track a reference signal.

3. A device as in claim 2, in which the signal locking and tracking means further comprise an edge detector, one input of which is connected to the input signal receiving means, the output of which is connected to one of the phase lock loops, adapted to double the frequency of the output signal generated at the output of the input signal receiving means, the input of the other phase lock loop being connected to the output of the input signal receiving means, a pair of diodes and a compensation circuit to which the outputs of the pair of phase lock loops are connected, a voltage controlled oscillator, to which the compensation circuit is connected, adapted to generate a signal at a frequency which is a multiple of the desired circuit clock signal, anda divider, the input of which is connected to the output of the voltage controlled oscillator, adapted to divide the signal generated in the voltage controlled oscillator by the multiple of the desired clock signal which such oscillator signal comprises to generate the desired clock signal.

4. A device as in claim 1, in which the input signal receiving means include a comparator, which includes positive and negative inputs thereto and an output therefrom, adapted to compare the input signals and provide an output indicating agreement or disagreement thereof, a pair of diodes connected at the input to the comparator, adapted to set the limits of the input circuit so as to limit the swing of the input to the comparator, a low pass filter connected at the input to the comparator adapted to pass all freqencies below, but not above, a reference frequency with little signal loss, a d-c filter connected to the negative input of the comparator and adapted to set the operting point thereof, and a voltage divider connected to the positive input and the output of the comparator, adapted to set up a small account of hysterisis so that the output signal will not oscillate.

5. A device as in claim 1, in which the direction detecting means comprise a flip flop, adapted to be pulsed to indicate whether a bit in the time code is a "1" or a "0" for indicating the direction of running of the videotape.

6. A device as in claim 1, in which the pulse counting means comprise a pair of counters, the input to one of which is the clock signal, adapted to count up from bit "0" to bit "79" in the time code, one of the outputs of which is the input to the "enable" of the other counter, and a plurality of NAND gates to which the outputs of the counters are connected, adapted to detect a valid number of pulses of time code per frame of videotape.

7. A device as in claim 1, further comprising means for generating an output signal adapted for use in film synchronization.

8. A device as in claim 1, further comprising means for generating a display clock output signal, adapted to enable multiplexing of the display.

9. A device as in claim 1, further comprising means for detecting an input signal below a preset frequency, and preventing the generating of an output signal thereupon, connected to the input signal receiving means.

10. A device as in claim 9, further comprising means for reducing the duty cycle of the clock signal generated in the frequency locking means, for further enabling reading of difficult-to-read time code, connected to the frequency detecting means and frequency locking means.

11. A device as in claim 10, in which the frequency locking means include an edge detector, one input of which is connected to the input signal receiving means, and in which the clock signal duty cycle reducing means comprise a divider, to the "enable" input of which the output of the frequency locking means is connected, and a dual "D" flip flop, to the inputs of which are connected the edge detector and input signal frequency detecting means, and to the "reset" of which are connected outputs of the divider.

12. A device as in claim 10, further comprising means for initiating the process of counting the time code pulses up, connected to the sync word detecting means and the counting means, comprising a pair of flip flops, connected to each other, to the inputs of the first flip flop are connected the output of the sync word detecting means and the out put of the clock signal duty cycle reducing means, the output of which is connected to the input of the direction detecting means.

13. A device as in claim 10, further comprising means for detecting a binary "1" in the signal, connected to the clock duty cycle reducing means and the frequency locking means.

14. A device as in claim 13, in which the binary "1" detecting means comprise an RS flip flop.

15. A device as in claim 13, further comprising means for detecting a string of binary "1"s in a signal, connected to the binary "1" detecting means and the frequency locking means.

16. A device as in claim 15, in which the string of binary "1"s detecting means comprise a flip flop.

17. A device as in claim 15, in which the sync word detecting means comprise a counter, adapted to detect the time code sync word, to the "enable" input of which counter is connected the output of the binary "1" detecting means, to the "reset" of which counter is connected the output of the string of binary "1" s detecting means, and a NAND gate to which the outputs of the counter are connected, for generating an output signal representing the count of pulses by the counter.

* * * * *